(12) United States Patent
Chen et al.

(10) Patent No.: US 11,332,034 B2
(45) Date of Patent: May 17, 2022

(54) BATTERY REPLACEMENT SYSTEM AND AUTOMATIC GUIDED VEHICLE

(71) Applicants: INVENTEC (PUDONG) TECHNOLOGY CORPORATION, Shanghai (CN); INVENTEC CORPORATION, Taipei (TW)

(72) Inventors: Po-Jui Chen, Taipei (TW); Ching-Yuan Liu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 129 days.

(21) Appl. No.: 16/901,981

(22) Filed: Jun. 15, 2020

(65) Prior Publication Data
US 2021/0291696 A1    Sep. 23, 2021

(30) Foreign Application Priority Data
Mar. 19, 2020  (CN) .......................... 202010197011.9

(51) Int. Cl.
*B60L 53/80* (2019.01)
*B60S 5/06* (2019.01)

(52) U.S. Cl.
CPC ................. *B60L 53/80* (2019.02); *B60S 5/06* (2013.01)

(58) Field of Classification Search
None
See application file for complete search history.

(56) References Cited

U.S. PATENT DOCUMENTS

2007/0113921 A1*  5/2007  Capizzo ............... B60K 15/067
                                                          141/231
2012/0271723 A1* 10/2012  Penilla ................. B60L 53/305
                                                          705/16

* cited by examiner

*Primary Examiner* — David V Henze-Gongola
(74) *Attorney, Agent, or Firm* — Maschoff Brennan

(57) ABSTRACT

A battery replacement system is configured to move a spare battery to an automatic guided vehicle. The battery replacement system includes a charging stand and a carrier. The charging stand includes a base and a plurality of supporting seat. The supporting seats are pivotably disposed on the base and configured to support the spare battery. The carrier includes a frame and a clamping component. The frame is located aside the charging stand. The clamping component is movably disposed on the frame and configured to replace a vehicle battery on the automatic guided vehicle with the spare battery.

10 Claims, 6 Drawing Sheets

BATTERY REPLACEMENT SYSTEM AND AUTOMATIC GUIDED VEHICLE

CROSS-REFERENCE TO RELATED APPLICATIONS

This non-provisional application claims priority under 35 U.S.C. § 119(a) on Patent Application No(s). 202010197011.9 filed in China on Mar. 19, 2020, the entire contents of which are hereby incorporated by reference.

BACKGROUND

Technical Field of the Invention

This disclosure relates to a battery replacement system and an automatic guided vehicle.

Description of the Related Art

Automatic guided vehicle (AGV) has been widely used in an automatic production line. An automatic guided vehicle is an unmanned automatic vehicle which has a battery and is equipped with a light or magnetic navigation device and an independent addressing system. By monitoring from a computer, an automatic guided vehicle can autopilot based on the command of the computer and arrive at a designated place along a set route to complete work under a specific environment.

In general, the power source of the automatic guided vehicle is a built-in and non-removable battery. When the battery of the automatic guided vehicle is nearly or completely depleted, the entire automatic guided vehicle may require to be moved to a charging station for charging the battery of the automatic guided vehicle. Then, the automatic guided vehicle can return to the production line after the battery of the automatic guided vehicle is fully charged. However, during the charging of the battery, the automatic guided vehicle cannot work, thus the operation of the production line is affected, thereby reducing the efficiency of the production line or even interrupting the production line.

SUMMARY OF THE INVENTION

The disclosure provides a battery replacement system and an automatic guided vehicle which is capable of increasing the efficiency of the production line.

According to one embodiment of the disclosure, a battery replacement system is configured to move a spare battery to an automatic guided vehicle. The battery replacement system includes a charging stand and a carrier. The charging stand includes a base and a plurality of supporting seats. The plurality of supporting seats are pivotably disposed on the base, and the plurality of supporting seats are configured to support and charge the spare battery. The carrier includes a frame and a clamping component. The frame is located aside the charging stand. The clamping component is movably disposed on the frame, and the clamping component is configured to move a vehicle battery on the automatic guided vehicle to one of the plurality of supporting seats which is empty and move the spare battery on another of the supporting seats to the automatic guided vehicle.

According to another embodiment of the disclosure, an automatic guided vehicle is configured to obtain a spare battery via a battery replacement system. The automatic guided vehicle includes a main body and a vehicle battery. The main body has a top surface. The vehicle battery is stacked on the top surface of the main body and electrically connected to the main body. The vehicle battery is configured to be replaced with the spare battery via the battery replacement system.

According the battery replacement system and the automatic guided vehicle as discussed above, the vehicle battery is disposed on the top surface of the main body of the automatic guided vehicle, and the vehicle battery can be replaced with the spare battery on the charging stand by the battery replacement system. As such, the vehicle battery can be charged by the charging stand, and the automatic guided vehicle can obtain the spare battery, thus the automatic guided vehicle can work in a production line immediately, thereby increasing efficiency of a production line.

BRIEF DESCRIPTION OF THE DRAWINGS

The present disclosure will become better understood from the detailed description given hereinbelow and the accompanying drawings which are given by way of illustration only and thus are not intended to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
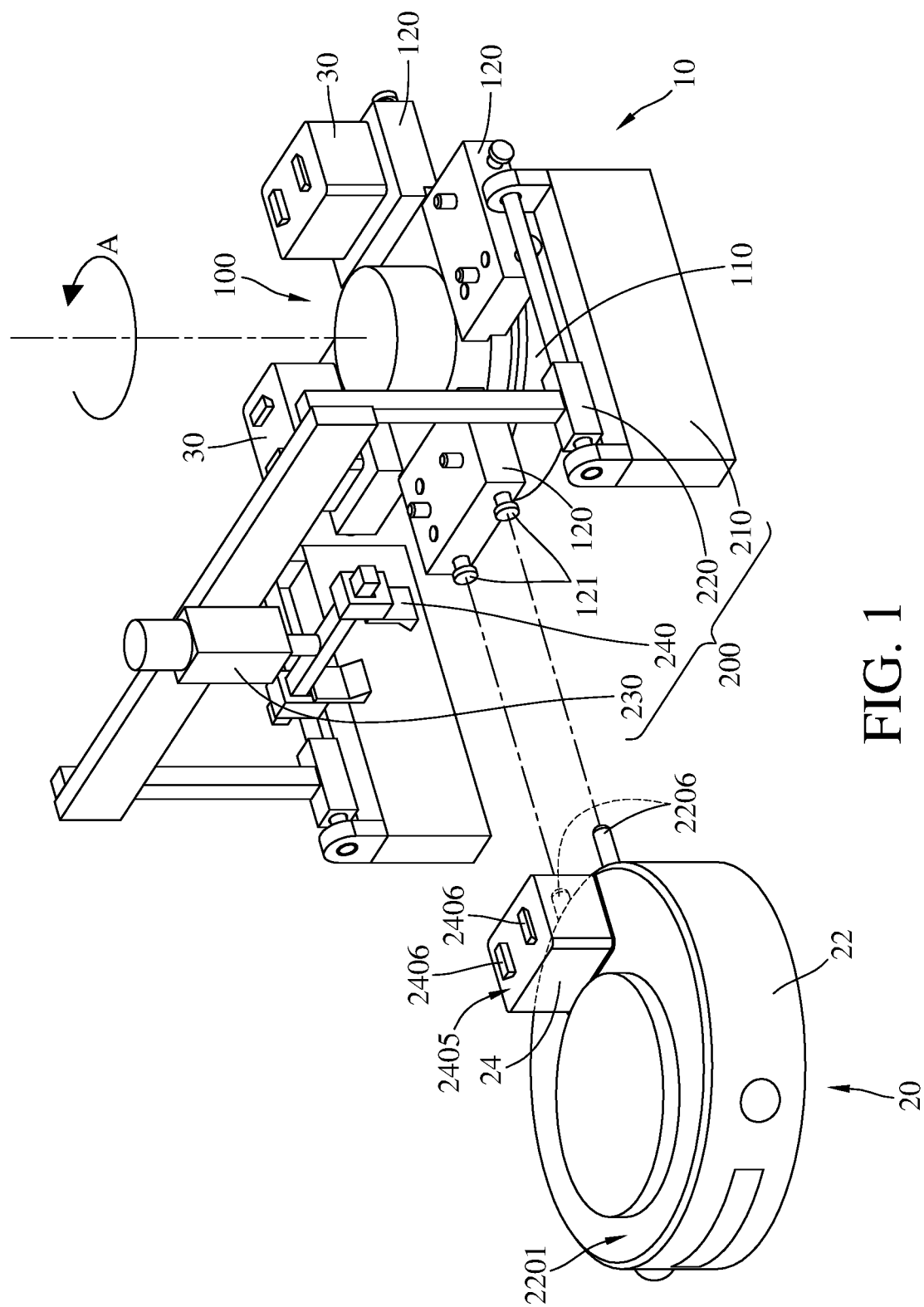
FIG. 1 is a perspective view of a battery replacement system and an automatic guided vehicle according to a first embodiment of the disclosure.
Figure 2:
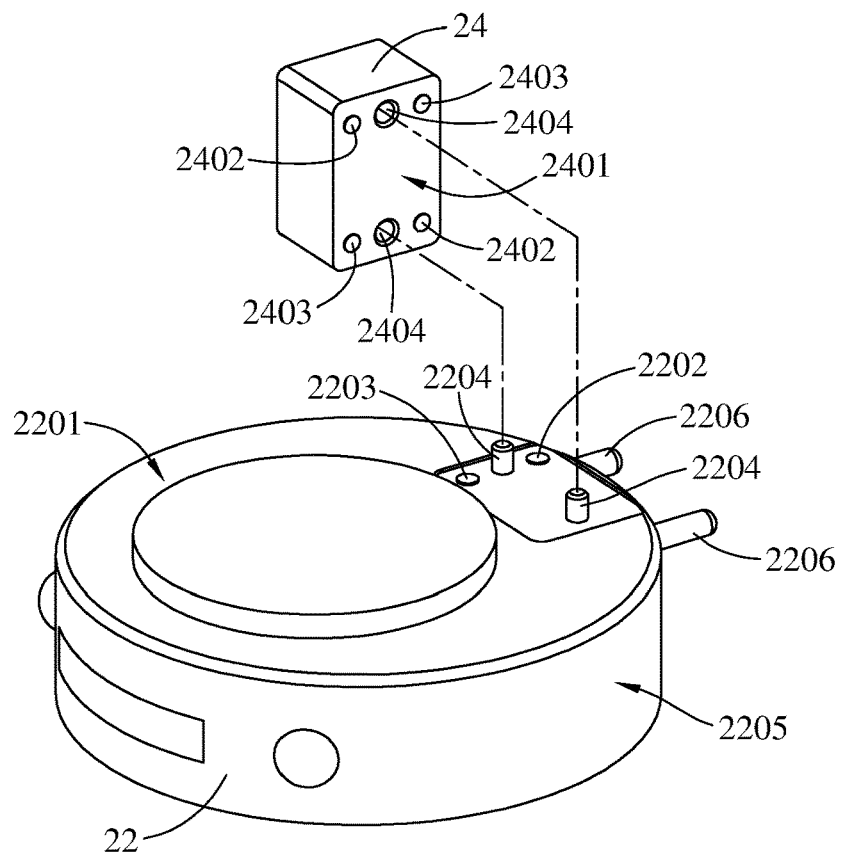
FIG. 2 is a partial exploded view of the automatic guided vehicle and a vehicle battery in FIG. 1.
Figure 3:
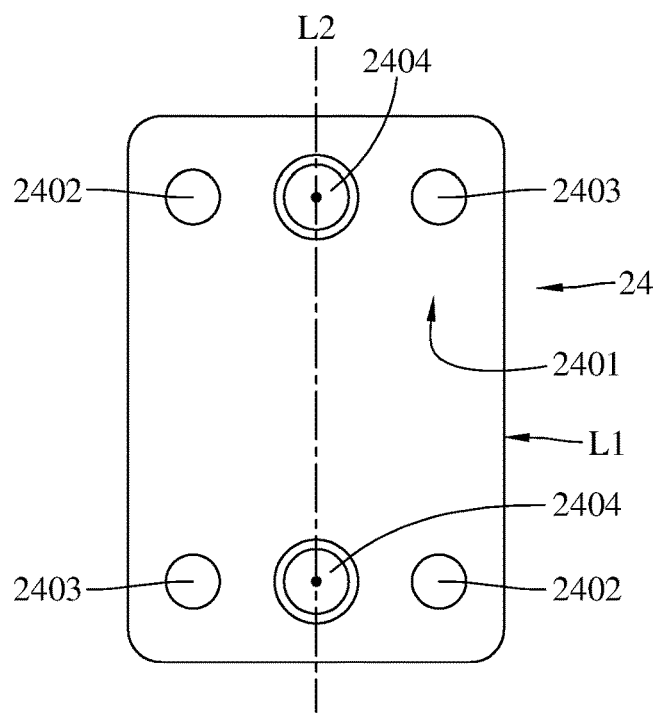
FIG. 3 is a bottom view of the vehicle battery in FIG. 2.

Referring to FIGS. 1 to 3, where FIG. 1 is a perspective view of a battery replacement system 10 and an automatic guided vehicle 20 according to a first embodiment of the disclosure, FIG. 2 is a partial exploded view of the automatic guided vehicle 20 and a vehicle battery 24 in FIG. 1, and FIG. 3 is a bottom view of the vehicle battery 24 in FIG. 2.

In this embodiment, the battery replacement system 10 is configured to move a spare battery 30 to the automatic guided vehicle 20. The battery replacement system 10 includes a charging stand 100 and a carrier 200. The charging stand 100 includes a base 110 and a plurality of supporting seats 120. The supporting seats 120 are pivotably disposed on the base 110, and the supporting seats 120 are pivotable with respect to the base 110 along a direction A. The supporting seats 120 are configured to support and charge the spare battery 30.

The carrier 200 includes a frame 210, a horizontal movement device 220, a lifting device 230 and a clamping component 240. The frame 210 is located aside the charging stand 100. The horizontal movement device 220 is disposed on the frame 210. The lifting device 230 is disposed on the horizontal movement device 220. The clamping component 240 is disposed on the lifting device 230, and the clamping component 240 is configured to clamp the vehicle battery 24 or the spare battery 30. Specifically, the clamping component 240 can move with respect to the frame 210, and the clamping component 240 is configured to move the vehicle battery 24 on the automatic guided vehicle 20 to one of the supporting seats 120 which is empty and move the spare battery 30 on another of the supporting seats 120 to the automatic guided vehicle 20.

In this embodiment, the battery replacement system 10 may further include a plurality of charging electrodes 121. The charging electrodes 121 are respectively disposed on the supporting seats 120, and the charging electrodes 121 are configured to charge the automatic guided vehicle 20.

The automatic guided vehicle 20 includes a main body 22 and a vehicle battery 24. The main body 22 has a top surface 2201 and a side surface 2205. The side surface 2205 is connected to an edge of the top surface 2201. The vehicle battery 24 has a rectangular bottom surface 2401 and a rectangular top surface 2405. The rectangular top surface 2405 faces away from the rectangular bottom surface 2401. The rectangular bottom surface 2401 of the vehicle battery 24 is stacked on the top surface 2201 of the main body 22, and the vehicle battery 24 is electrically connected to the main body 22. When the vehicle battery 24 is nearly depleted, the vehicle battery 24 may be replaced with the spare battery 30 via the battery replacement system 10.

In this embodiment, the vehicle battery 24 may further have two positive battery electrodes 2402 and two negative battery electrodes 2403. The two positive battery electrodes 2402 and the two negative battery electrodes 2403 are respectively located at corners of the rectangular bottom surface 2401 of the vehicle battery 24. The main body 22 has a positive electrode 2202 and a negative electrode 2203. The positive electrode 2202 of the main body 22 and the negative electrode 2203 of the main body 22 are located on the top surface 2201 of the main body 22. The positive electrode 2202 of the main body 22 is electrically connected to one of the two positive battery electrodes 2402. The negative electrode 2203 of the main body 22 is electrically connected to one of the two negative battery electrodes 2403. Note that since the vehicle battery 24 has two positive battery electrodes 2402 and two negative battery electrodes 2403, such that there are two placement positions of the vehicle battery 24 on the main body 22, and one of the positive battery electrodes 2402 and one of the negative battery electrodes 2403 of the vehicle battery 24 can be electrically connected to the positive electrode 2202 and the negative electrode 2203 of the main body 22 when the vehicle battery 24 is placed in either position. Therefore, the arrangement of the foolproof design of the two positive battery electrodes 2402 and the two negative battery electrode 2403 can reduce the incorrect connection between the vehicle battery 24 and the main body 22 of the automatic guided vehicle 20.

In this embodiment, the two positive battery electrodes 2402 are respectively located at two diagonal corners of the rectangular bottom surface 2401, and the two negative battery electrodes 2403 are respectively located at the other two diagonal corners of the rectangular bottom surface 2401.

In this embodiment, the vehicle battery 24 may further have two positioning structures 2404. The two positioning structures 2404 are located on the rectangular bottom surface 2401 of the vehicle battery 24. A line penetrating through the two positioning structures 2404 of the vehicle battery 24 is parallel to a long side L1 of the rectangular bottom surface 2401. The main body 22 may further have two positioning structures 2204. The two positioning structures 2204 are located on the top surface 2201. The two positioning structures 2204 of the main body 22 and the two positioning structures 2404 of the vehicle battery 24 are respectively protrusions and recesses that mating each other. The two positioning structures 2204 of the main body 22 are respectively connected to the two positioning structures 2404 of the vehicle battery 24.

In this embodiment, the vehicle battery 24 may further have two engagement structures 2406. The two engagement structures 2406 protrude from the rectangular top surface 2405 of the vehicle battery 24. The two engagement structures 2406 are configured to be clamped by the clamping component 240 of the battery replacement system 10, such that the vehicle battery 24 can be moved by the battery replacement system 10.

In this embodiment, the main body 22 may further have two connecting electrodes 2206. The connecting electrodes 2206 are located on the side surface 2205. The connecting electrodes 2206 are configured to be electrically connected to the charging electrodes 121 of the charging stand 110 of the battery replacement system 10.

Figure 4:
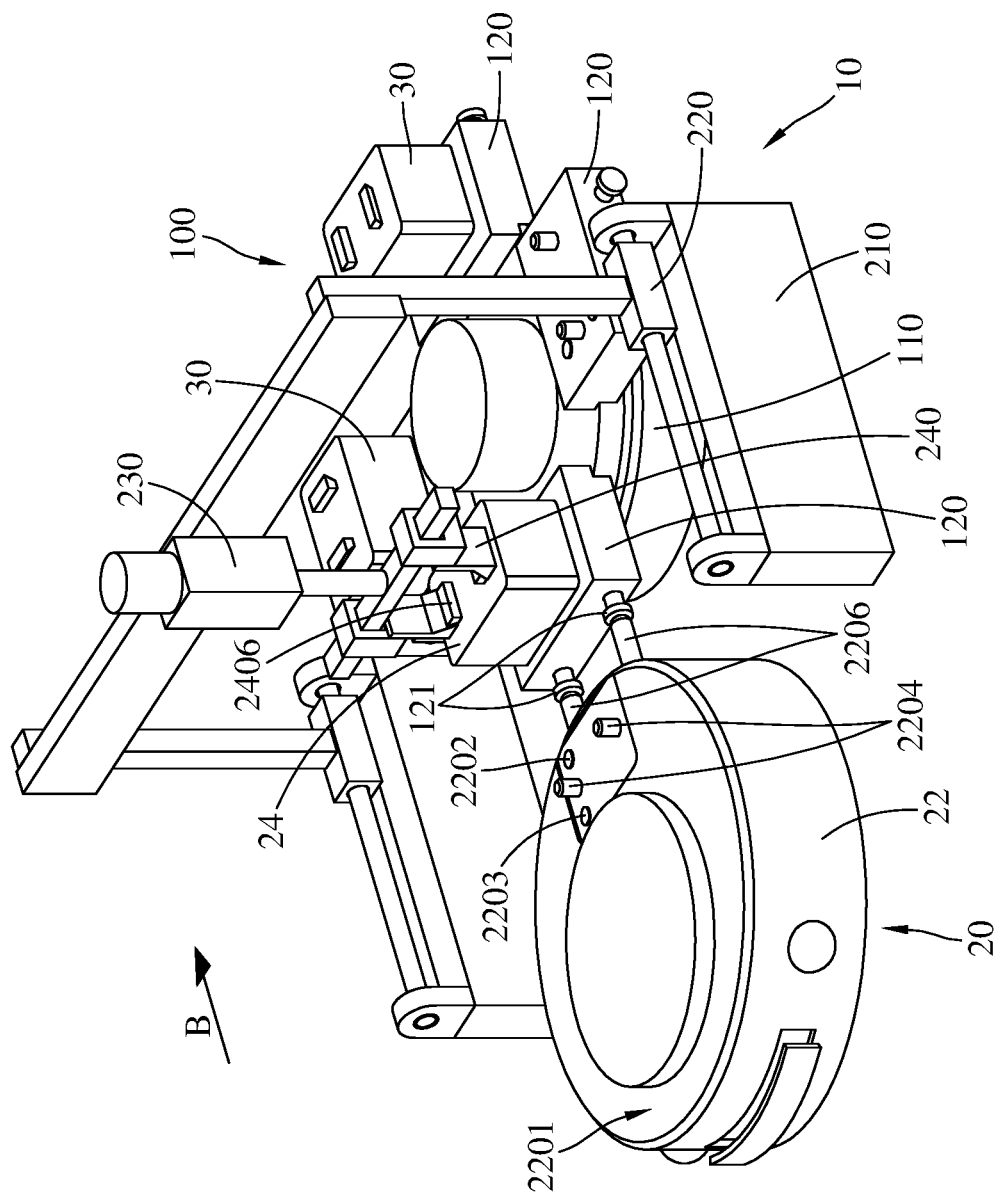
FIGS. 4 to 6 are perspective views of the battery replacement system in FIG. 1 when the vehicle battery on the automatic guided vehicle is moved by the battery replacement system.
Figure 5:
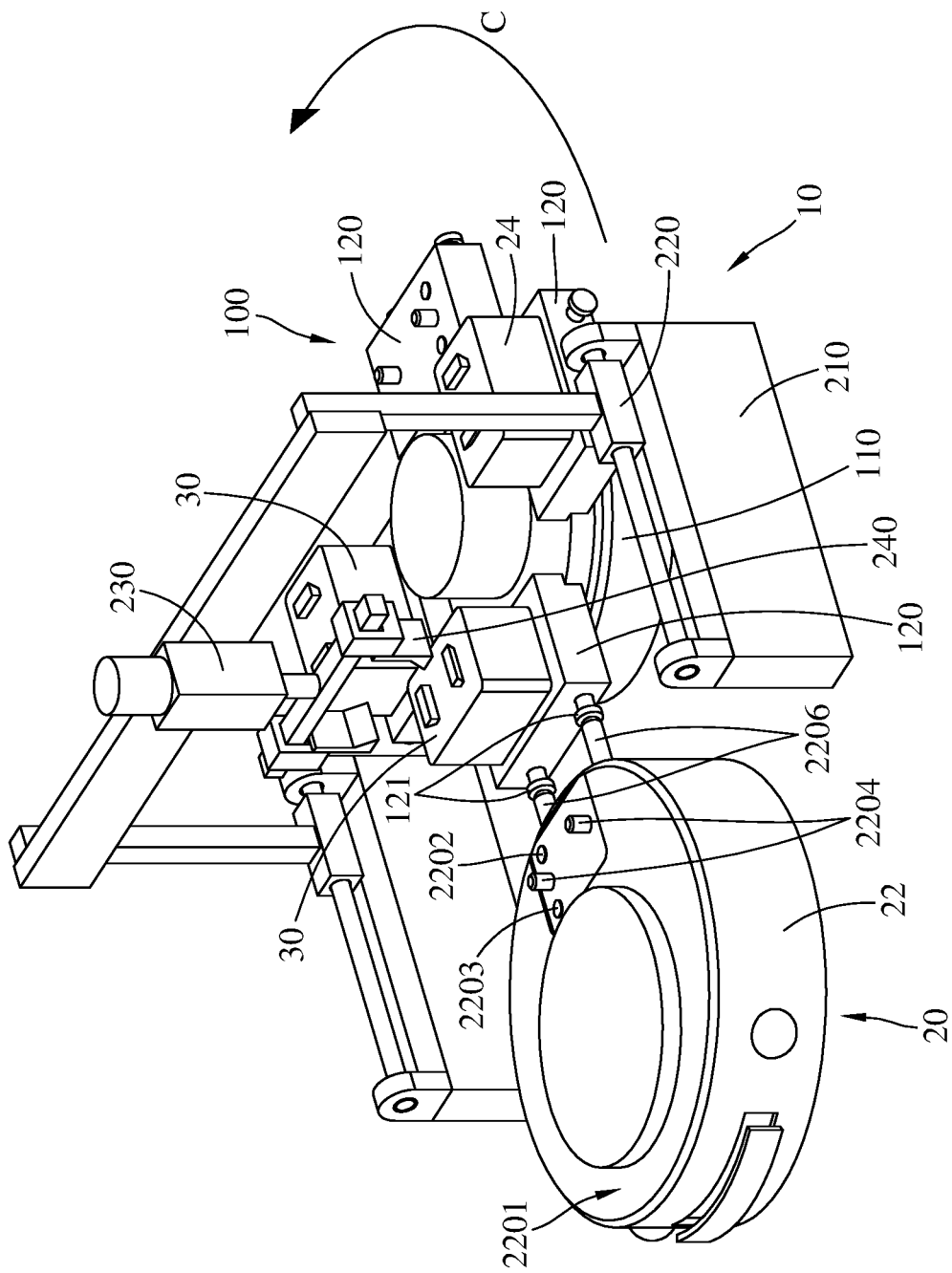
Figure 6:
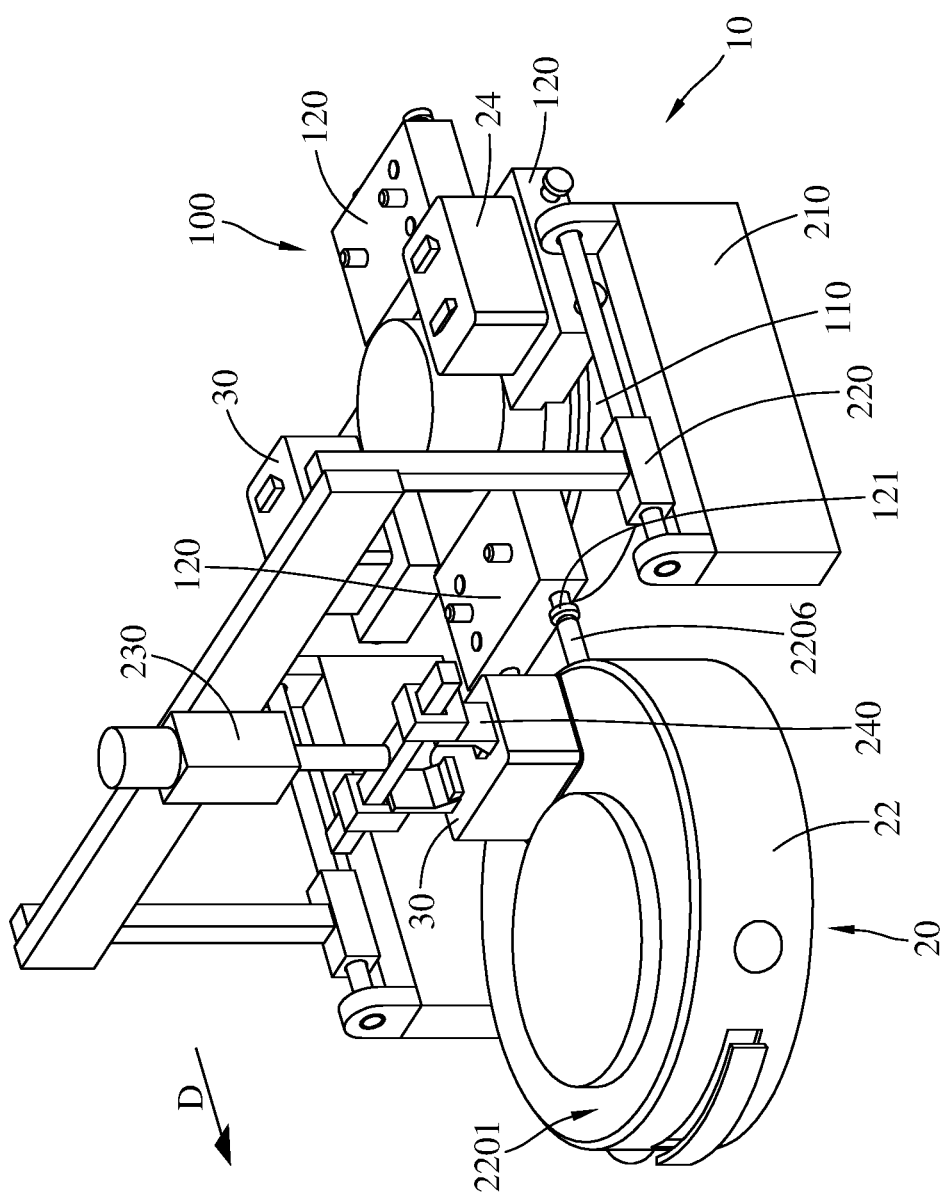

Please refer to FIGS. 4 to 6, where FIGS. 4 to 6 are perspective views of the battery replacement system 10 in FIG. 1 when the vehicle battery 24 on the automatic guided vehicle 20 is moved by the battery replacement system 10.

As shown in FIG. 4, when the vehicle battery 24 on the automatic guided vehicle 20 is nearly depleted, the automatic guided vehicle 20 is set to move toward the battery replacement system 10. After the automatic guided vehicle 20 moves to the battery replacement system 10, the battery replacement system 10 moves the nearly depleted vehicle battery 24 (e.g., along a direction B) from the automatic guided vehicle 20 to the empty charging stand 100 via the clamping component 240, the lifting device 230, and the horizontal movement device 220. As such, the charging stand 100 can charge the nearly depleted vehicle battery 24.

In addition, during the movement of the nearly depleted vehicle battery 24 by the battery replacement system 10, the connecting electrodes 2206 of the automatic guided vehicle 20 are electrically connected to the charging electrodes 121 of the charging stand 100, such that the automatic guided vehicle 20 is maintained in a standby state.

Then, as shown in FIG. 5, the supporting seats 120 of the charging stand 100 are pivoted along a direction C to move the spare battery 30 which is fully charged to a position near the automatic guided vehicle 20.

Then, as shown in FIG. 6, the battery replacement system 10 moves the fully charged spare battery 30 (e.g., along a direction D) from the supporting seat 120 to the automatic guided vehicle 20 via the clamping component 240, the lifting device 230, and the horizontal movement device 220, such that the automatic guided vehicle 20 is turned to a working state from the standby state. In this way, the automatic guided vehicle 20 can work immediately after obtaining the fully charged spare battery 30.

Figure 7:
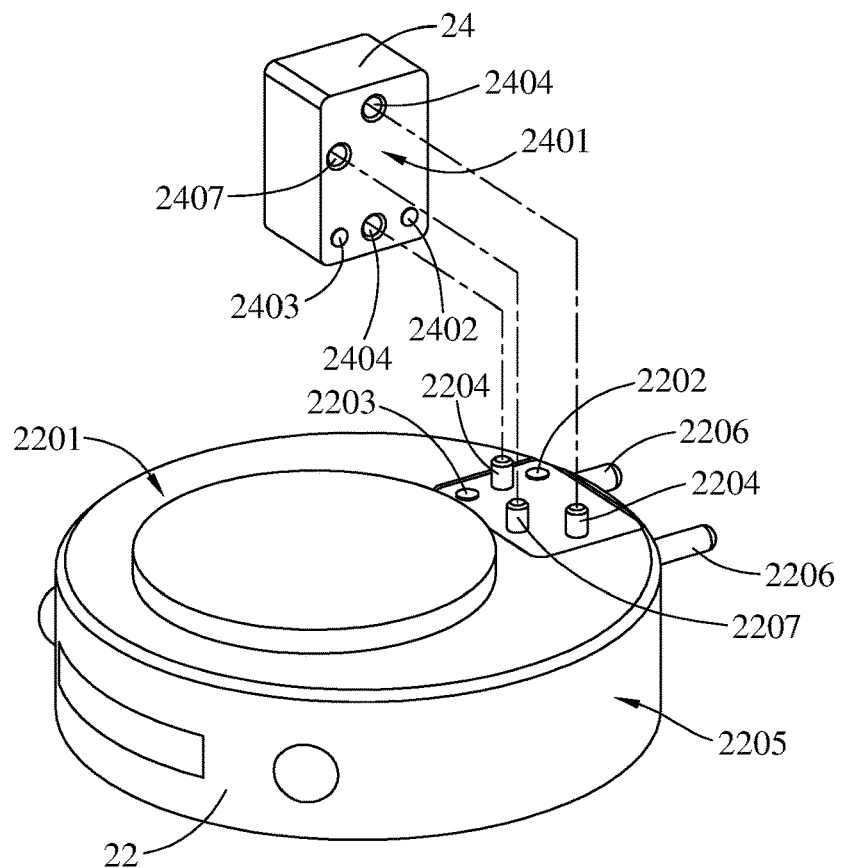
FIG. 7 is an exploded view of an automatic guided vehicle and a vehicle battery according to a second embodiment of the disclosure.
Figure 8:
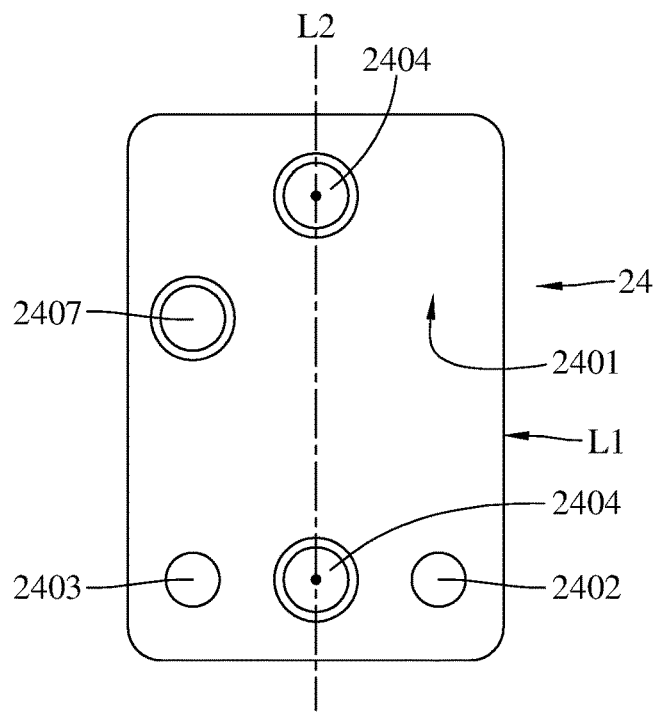
FIG. 8 is a bottom view of the vehicle battery in FIG. 7.

In this embodiment, the quantity of the positive battery electrodes 2402 and the negative battery electrode 2403 of the vehicle battery 24 is not restricted in the disclosure. For example, referring to FIGS. 7 and 8, where FIG. 7 is an exploded view of an automatic guided vehicle 20 and a vehicle battery 24 according to a second embodiment of the disclosure, and FIG. 8 is a bottom view of the vehicle battery 24 in FIG. 7.

In this embodiment, the vehicle battery 24 has only one positive battery electrode 2402 and only one negative battery electrode 2403. In addition, the vehicle battery 24 further has a foolproof structure 2407. The foolproof structure 2407 of the vehicle battery 24 is located on the rectangular bottom surface 2401 of the vehicle battery 24 and located at one side of the line L2 penetrating through the positioning structures 2404 of the vehicle battery 24. The main body 22 further has a foolproof structure 2207. The foolproof structure 2207 of the main body 22 is located on the top surface 2201 of the main body 22. The foolproof structure 2207 of the main body 22 is connected to the foolproof structure 2407 of the vehicle battery 24. Therefore, incorrect connection between the vehicle battery 24 and the main body 22 of the automatic guided vehicle 20 can be reduced via the foolproof design of the foolproof structure 2407 of the vehicle battery 24 and the foolproof structure 2207 of the main body 22.

According the battery replacement system and the automatic guided vehicle as discussed above, the vehicle battery is disposed on the top surface of the main body of the automatic guided vehicle, and the vehicle battery can be replaced with the spare battery on the charging stand by the battery replacement system. As such, the vehicle battery can be charged by the charging stand, and the automatic guided vehicle can obtain the spare battery, thus the automatic guided vehicle can work in a production line immediately, thereby increasing efficiency of a production line.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A battery replacement system, configured to move a spare battery to an automatic guided vehicle, comprising:
   a charging stand comprising a base and a plurality of supporting seats, wherein the plurality of supporting seats are pivotably disposed on the base, and the plurality of supporting seats are configured to support and charge the spare battery; and
   a carrier comprising a frame and a clamping component, wherein the frame is located aside the charging stand, the clamping component is movably disposed on the frame, and the clamping component is configured to move a vehicle battery on the automatic guided vehicle to one of the plurality of supporting seats which is empty and move the spare battery on another of the plurality of supporting seats to the automatic guided vehicle.

2. The battery replacement system of claim 1, further comprising a plurality of charging electrodes, wherein the plurality of charging electrodes are disposed on the plurality of supporting seats, and the plurality of charging electrodes are configured to charge the automatic guided vehicle.

3. The battery replacement system of claim 1, wherein the carrier further comprises a horizontal movement device and a lifting device, the horizontal movement device is disposed on the frame, the lifting device is disposed on the horizontal movement device, and the clamping component is disposed on the lifting device.

4. An automatic guided vehicle, configured to obtain a spare battery via a battery replacement system of claim 1, comprising:
   a main body having a top surface; and
   a vehicle battery stacked on the top surface of the main body and electrically connected to the main body, wherein the vehicle battery is configured to be replaced with the spare battery via the battery replacement system of claim 1.

5. The automatic guided vehicle of claim 4, wherein the main body further has a connecting electrode, and the connecting electrode is configured to electrically connect to a charging electrode of a charging stand of the battery replacement system.

6. The automatic guided vehicle of claim 4, wherein the vehicle battery has a rectangular bottom surface, two positive battery electrodes and two negative battery electrodes, the positive battery electrodes and the negative battery electrodes are respectively located at corners of the rectangular bottom surface of the vehicle battery, the main body has a positive electrode and a negative electrode located on the top surface of the main body, the positive electrode of the main body is electrically connected to one of the two positive battery electrodes, and the negative electrode of the main body is electrically connected to one of the two negative battery electrodes.

7. The automatic guided vehicle of claim 6, wherein the two positive battery electrodes are respectively located at two diagonal corners of the rectangular bottom surface, and the two negative battery electrodes are respectively located at the other two diagonal corners of the rectangular bottom surface.

8. The automatic guided vehicle of claim 6, wherein the vehicle battery further has two positioning structures located at the rectangular bottom surface, a line penetrating through the two positioning structures of the vehicle battery is parallel to a long side of the rectangular bottom surface of the vehicle battery, the main body has two positioning structures located on the top surface, the two positioning structures of the main body and the two positioning structures of the vehicle battery are recesses and protrusions that mating each other, and the two positioning structures of the main body are respectively connected to the two positioning structures of the vehicle battery.

9. The automatic guided vehicle of claim 8, wherein the vehicle battery further has a foolproof structure located on the rectangular bottom surface of the vehicle battery and on one side of the line penetrating through the positioning structures of the vehicle battery, the main body comprises a foolproof structure located on the top surface of the main body, and the foolproof structure of the main body is connected to the foolproof structure of the vehicle battery.

10. The automatic guided vehicle of claim 6, wherein the vehicle battery further has a rectangular top surface and two engagement structures, the rectangular top surface faces away from the rectangular bottom surface, and the two engagement structures protrude from the rectangular top surface.

* * * * *